3,139,452
OXIDATION OF p-XYLENE TO TEREPHTHALIC ACID
Allan S. Hay, Watervliet, N.Y., assignor to General Electric Company, a corporation of New York
No Drawing. Filed Feb. 25, 1957, Ser. No. 641,845
1 Claim. (Cl. 260—524)

This invention relates to a unique oxidation catalyst, to the oxidation of aralkyl compounds, and to the preparation of aromatic carbonyl compounds. More particularly, this invention relates to a process of preparing aromatic carboxylic acids and ketones at a rapid reaction rate and in high yields by a process which comprises reacting in solution the alkyl group of aralkyl compounds with oxygen in the presence of a catalyst soluble in the reaction mixture and consisting essentially of a combination of cobalt, bromine and a carboxylic acid. This invention also relates to the catalyst employed in this oxidation.

Heretofore, a number of processes have been developed for using oxygen to oxidize the alkyl groups or aralkyl compounds to form aromatic carboxylic acids. However, all of these prior art processes suffer from the fact that their reaction rates are extremely slow when moderate reaction conditions, such as low reaction temperature, atmospheric pressure, small amounts of catalysts, etc., are employed. Thus, using atmospheric pressure, temperatures of about 100° C., and small amounts of catalysts, extended reaction times of 20 to 50 hours or more are required to oxidize such aralkyl compounds as xylene in appreciable yields. Furthermore, the processes of the prior art do not oxidize ortho-, meta-, and para-aralkyl compounds with equal facility. Thus, according to the prior art processes, meta- and para-xylenes are oxidized to the corresponding carboxylic acids with greater facility than ortho-xylene.

When either arylmethyl or other aralkyl compounds are oxidized with oxygen in the presence of a cobalt catalyst according to the processes of the prior art, aromatic carboxylic acids are obtained in each instance. For example, when either toluene or ethylbenzene is oxidized with oxygen in the presence of cobalt according to the prior art, the product in both instances is benzoic acid. Thus, where an alkylbenzene having more than one carbon atom in the alkyl group is oxidized by prior art processes, cleavage of all carbon atoms of the alkyl group except for the carbon adjacent to the benzene ring is effected. Any ketones formed are usually in the nature of transient intermediates.

Unexpectedy, I have now discovered that aromatic carboxylic acids and ketones can be prepared in high yield at an extremely rapid rate, for example, in from 15 minutes to an hour or more, under moderate reaction conditions by a process which comprises reacting in a liquid phase the alkyl group of an aralkyl compound with oxygen in the presence of a catalyst soluble in the reaction mixture and consisting essentially of a combination of cobat, bromine and a carboxylic acid. The reaction oxidizes aryl methyl compounds to aromatic carboxylic acids and other aralkyl compounds primarily to arylalkyl ketones.

The catalyst for this reaction is so unique and specific that the omission or substitution of one component renders it substantially inactive. Thus, the omission of bromine or the substitution of other closely related components, such as iron for cobalt, chlorine or iodine for bromine, etc., renders the catalyst inactive. The reaction takes place with such ease that when a reaction mixture containing xylene, acetic acid, bromine and cobalt is left overnight at room temperature in contact with air, benzene-carboxylic acids precipitate from the reaction mixture. Ethylbenzene under similar conditions yield acetophenone. This occurs despite the fact that air is not passed into the reaction mixture and no special equipment is employed.

Unexpectedly, this reaction oxidizes the methyl groups or ortho-, meta-, and para-aryl methyl compounds, such as the isomeric xylenes, to the corresponding carboxylic acids with substantially equal facility. Furthermore, the reaction primarily oxides the α-methylene group ($-CH_2-$) of the alkyl group of aralkyl compounds containing more than one carbon atom in the alkyl group to a keto group instead of to a carboxylic acid. Thus, when ethylbenzene is oxidized according to this invention, there is obtained 80–90% or higher yields of acetophenone instead of benzoic acid. This result is unexpected since the oxidation processes of the prior art using oxygen as an oxidizing agent in the presence of cobalt produce carboxylic acids by cleaving all carbons from the alkyl group except that carbon which is adjacent to the aromatic ring. It will be noted that methyl groups and α-methylene groups contain at least two hydrogen atoms on the α-carbon atom which is the carbon atom next to the aryl group. Theerfore, the alkyl groups which are oxidized by my process may collectively and definitively be described as alkyl groups having at least two hydrogen atoms on the α-carbon atom.

In carrying out the process of the present invention, an aralkyl compound, a suitable solvent, which preferably is a carboxylic acid, such as acetic or propionic acid, and the catalyst soluble in the reaction mixture and consisting essentially of a combination of cobalt, bromine, and a carboxylic acid (also referred to as the "cobalt-bromine-carboxylic catalyst" or "catalyst") are added to a suitable reaction vessel and heated to reaction temperature. Oxygen is then passed into the reaction mixture at the desired rate for the desired period of time. After the reaction is completed, the aromatic carboxylic acids or ketones are then separated from the reaction mixture by conventional methods. The process can also be carried out in a continous manner by continously adding both an aralkyl compound and oxygen to a solution of the cobalt-bromine-carboxylic catalyst in a solvent. Alternately, a part of the catalyst can be present in one part of the system while the other part of the catalyst is added with a reactant. Thus, cobalt can be present in acetic acid and bromine added with the aralkyl compound. By reusing the mother liquid of a prior run in a subsequent run, one can continuously reuse the catalyst.

The term "aralkyl compound" as used in the present invention refers to organic compounds containing an aromatic nucleus to which is bonded at least one linear alkyl radical having at least two hydrogen atoms on the α-carbon atom. These alkyl radicals include methyl, ethyl, propyl, butyl, octyl, etc. radicals. The term is thus seen to include aralkyl hydrocarbons such as the alkyl benzenes and the various alkyl naphthalenes i.e., mono-, di-, tri-, etc. alkyl-substituted benzenes, for example, toluene, the three isomeric xylenes, mesitylene, etc.; mono-, di-, tri-, tetra-, etc. alkyl-substituted diphenyls; mono-, di-, tri-, tetra-, etc. alkyl-substituted diphenylalkanes, for example diphenylmethanes; mono-, di-, tri-, etc. alkyl-substituted naphthalenes for example α-methyl naphthalene, amyl naphthylene, etc. In addition to hydrocarbon materials, the term also encompases aralkyl compounds containing other elements besides carbon and hydrogen, for example, oxygen, sulfur, bromine, etc. Thus, the term includes the three isomeric toluic acids, alkyl-substituted acetophenones, alkyl-substituted diphenylketones, for example, p,p'-dimethyl diphenylketone, alkyl-substituted diphenyl-sulfones, for example, p,p'-dimethyl diphenylsulfone, etc.; bromotoluene, bromotoluic acid, etc. The term also includes aryl methyl compounds and other aralkyl compounds as well as aryl methyl compounds containing other alkyl groups in addition to methyl groups, for example ethyltoluene, whose other alkyl groups are usually oxidized primarily to ketones during the reaction.

In my copending application, S.N. 641,843, now abandoned, filed concurrently herewith and assigned to the same assignee as the present invention, I have disclosed and claimed the oxidation of aralkyl compounds which are substituted on the alkyl group. These compounds are represented by the formula:

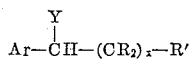

when $x$ is zero or a whole number, for example, 1–10 or higher, Ar is an aryl nucleus, for example, a benzene nucleus, a naphthalene nucleus, etc., R and Y are selected from the group consisting of hydrogen, a hydrocarbon radical, for example, alkyl, cycloalkyl, aryl, etc. radicals, R' is selected from the group consisting of a cycloalkyl radical, an aryl radical, a carboxylic acid radical, an ester thereof, an alcohol radical, an ester thereof, an ether radical, an acetal radical, a carbonyl radical, etc. These substituted groups may also contain halogen, for example, bromine, e.g., the bromophenyl radical, etc. The aryl nucleus may also be substituted with similar groups directly attached to the aromatic ring.

The aralkyl compounds of the instant application differ from the starting materials of the above-identified application in that the alkyl groups of the aralkyl compounds of the instant application are free of substituents and may be described as linear alkyl groups. Such terminology does not exclude branched chain alkyl compounds such as 2-methylpropyl but would exclude cycloaliphatic substituted alkyl groups such as 2-cyclohexylpropyl which are included in my above-identified copending application.

By the process of the present invention, it is possible to prepare aromatic carboxylic acids, such as o-phthalic acid from o-xylene, isophthalic acid from m-xylene, terephthalic acid from p-xylene, benzoic acid from toluene, α-naphthalene carboxylic acid from α-methyl naphthalene, polycarboxylic acids from mesitylene (1,3,5-trimethylbenzene), the p,p'-dicarboxylic acids from the corresponding p,p'-dimethyldiphenyl, p,p'-dimethyldiphenyloxide, p,p'-dimethyldiphenylketone, p,p'-dimethyl diphenylsulfone, etc. It should be understood that some carboxylic acid containing some unoxidized methyl groups are also produced during the reaction, for example, o-toluic, m-toluic, p-toluic acid, etc.

By the process of the present invention, it is also possible to prepare many arylalkyl ketones; for example, o-diacetyl benzene from o-diethyl benzene, m-diacetylbenzene from m-diethylbenzene, p-diacetylbenzene from p-diethylbenzene, acetophenone from ethylbenzene, p,p'-diacetyl derivatives from the corresponding p,p'-diethyldiphenyl, p,p'-diethyldiphenylethers, p,p'-diethyldiphenylketones, p,p'-diethyldiphenylsulfones, α-acetyl naphthalene from α-ethyl naphthalene, etc. It should be understood that carboxylic acids as well as ketones are also produced during the reaction when the starting aralkyl compounds contain methyl as well as other alkyl radicals.

Although I do not wish to be bound by theory, it is believed that cobalt, bromine and carboxylic acid combine in some unusual manner to produce the unique catalyst of this invention. All of these components are essential to produce an active catalyst. The combination is so unique that the substitution of other elements for one or more component either totally stops or substantially impedes the reaction. Thus, little catalytic action is obtained when appreciable amounts of other elements which usually make excellent oxidation catalysts are present during the reaction. For example, the presence of appreciable amounts of iron, copper, etc. in the reaction mixture substantially stops the reaction. Similarly, the presence of appreciable amounts of certain anions, such as sulfate, nitrate, chlorate, etc. ions inhibit the activity of this unique catalyst. The substitution of oher halogens, such as chlorine for bromine, imparts to the catalyst no appreciably greater catalytic activity than is found in cobalt acetate, one of the usual prior art catalysts. The presence of appreciable amounts of iodine completely inactivates the catalyst. Taking the effect of cobalt and acetic acid in oxidizing o-xylene as having a relative rate constant of unity, chlorine used in conjunction with cobalt and acetic acid also has a relative rate constant of unity. In marked contrast, when bromine is used in conjunction with cobalt and acetic acid, an unusually high relative rate constant of 275 is effected.

The molar ratio of cobalt to bromine, calculated as monoatomic bromine (Br, atomic wgt. 79.916), more frequently called the atomic ratio, is important for maximum reaction rates. Optimum reaction rates are obtained when cobalt and bromine are present in substantially equiatomic amounts (i.e., 0.9–1.1 atoms of bromine per atom of cobalt). The rate of reaction decreases rapidly as the bromine-to-cobalt atomic ratio is increased, and conversely as the bromine-to-cobalt atomic ratio is decreased from unity there is a decrease in activity although this decrease is less marked. Thus, taking a bromine-to-cobalt atomic ratio of one as giving a relative rate constant of 100, increasing the atomic ratio to 1.2 produces a rate constant of 20, and further increasing the atomic ratio to 2 stops the reaction. In the other direction, decreasing the bromine-to-cobalt atomic ratio to 0.77 gives a relative rate constant of 80, while decreasing it to 0.38 gives a relative rate constant of 50, and decreasing it to 0.0077 gives a relative rate constant of 5. Although in practice I prefer to employ bromine-to-cobalt atomic ratios of about 0.3 to about 1, ratios of about 0.1 to 1.2 give satisfactory results. However, bromine-to-cobalt atomic ratios of 0.0077 to about 1.9 can also be employed. Although an initial bromine-to-cobalt atomic ratio of 2 substantially stops the reaction, bromine losses may occur during the reaction or during a continuous process or a multi-cycle reaction wherein the mother liquor is continuously reused, thus permitting the addition of more bromine, if desired. However, the catalytically effective atomic ratio should not be greater than 2.

The molar ratio of the carboxylic acid-to-cobalt has no upper limit with the result that carboxylic acids can be employed as solvents for the reaction. Although small amounts of carboxylic acids can be used to effect oxidation, for example in a molar ratio of about 2:1 in respect to cobalt, for optimum yields and rates it is preferable to employ larger amounts of carboxylic acid, preferably in solvent quantities.

The cobalt portion of the catalyst is furnished by cobalt compounds in the divalent or trivalent state. Specific compounds include cobalt salts of carboxylic acids and cobalt bromide. Where the reaction is carried out in the presence of a large amount of a carboxylic acid, for example, acetic acid, cobalt, regardless of its initial form, generally takes the form of the acetate in the reaction mixture. Therefore, any cobalt salt of the type described which is soluble in the solvent employed in an amount sufficient to form the catalyst is satisfactory for the process. The preferred source of cobalt is cobaltous acetate tetrahydrate (also referred to as "$Co(OAc)_2 \cdot 4H_2O$"). However, other suitable cobalt catalysts include the cobaltous salts of other lower aliphatic acids, such as, for example, cobaltous propionate, cobaltous butyrate, etc.

In addition, cobaltous salts of aromatic carboxylic acids, such as the acids produced by my process, may also be employed as catalysts. Thus, I can employ salts such as cobaltous toluate, cobaltous terephthalate, cobaltous naphthenate, etc. Cobalt salts of anions that inactivate the catalyst should be avoided, for example, cobalt salts containing sulfate, nitrate, iodide, iodate, chlorate, etc. ions.

The bromine portion of the catalyst is generally furnished by bromine compounds containing bromine capable of being readily removed from the parent compound. Specific compounds include the bromocarboxylic acids, for example, the bromoaliphatic acids, e.g., the bromoacetic acids, the bromopropionic acids, the bromobutyric acids, etc., cycloaliphatic carboxylic acids containing removable bromine, for example α-bromocyclohexanecarboxylic acid, etc.; free bromine (i.e., $Br_2$); bromocarbons containing bromine capable of being readily removed from the parent compound, for example, bromochloroform, etc.; hydrogen bromide, cobalt bromide, etc. I have found that one mole of HBr per mole of cobalt acetate produces an extremely active catalyst.

The carboxylic acid portion of the catalyst, which corresponds to a carbonyloxy radical formed by the removal of the hydrogen atom from the carboxyl group of a carboxylic acid, e.g., the acetoxy radical,

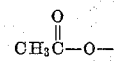

is the carbonyloxy radical formed by the removal of the hydrogen atom from the carboxyl group of acetic acid is generally furnished by carboxylic acids or salts of carboxylic acids. Examples of carboxylic acids and salts comprise those carboxylic acids mentioned hereinafter as solvents and the previously mentioned cobalt salts containing carboxyl groups. Other sources of the carboxylic portion of the catalyst comprise compounds capable of forming carboxylic acids in situ even in very small amounts.

A wide variety of solvents may be employed in the reaction with maximum yields being obtained with inert solvents which do not adversely affect the reaction and in which both reactant and catalyst are soluble. Because carboxylic acids make excellent solvents for both the reactant and catalyst, they are the preferred solvents. Since carboxylic acids form part of the catalyst and there is no upper limit to the amount of carboxylic acid the reaction will tolerate, these solvents can be used as the source of the carboxylic portion of the catalyst as well as the solvent. For obvious reasons, it is highly desirable to use a liquid carboxylic acid although solid carboxylic acids can be used in conjunction with other solvents or under liquefying conditions. Thus, benzoic acid dissolved in benzene has been used as a combined solvent and source of carboxylic acid for the catalyst system. Soluble, liquid, or liquefiable products of the oxidation can be used as solvents in the reaction so that separation steps are minimized. Examples of carboxylic acids comprise aliphatic carboxylic acids, for example, acetic, propionic, butyric, etc. acids, cycloaliphatic carboxylic acids, for example, naphthenic acid, cyclohexanecarboxylic acid, etc. In addition, carboxylic precursors, such as carboxylic anhydrides, for example acetic anhydride, etc., can also be employed. These anhydrides can serve as solvents, as a means for removing water and can furnish the carboxylic acids necessary for the catalyst. Mixtures of these acids with other solvents can also be employed, for example, mixtures of acetic acid with acetophenone, etc. As a class, the lower aliphatic carboxylic acids are preferred as solvents. The specific carboxylic acids preferred are acetic and propionic acids.

The rate of oxygen addition to the reaction is also not critical and may vary within any desired limits. Since the function of the oxygen is to oxidize the alkyl groups of the aralkyl compound to a carbonyl group, the rate of reaction is dependent to some extent on the amount of oxygen present at any given time in the reaction mixture. Thus, the rate of reaction is faster with higher rates of oxygen addition than with lower rates of addition. Satisfactory results have been obtained adding oxygen to the reaction mixture at the rate of from 0.01 to 10, and preferably from 0.5 to 5 parts by weight of oxygen per hour per part of the aralkyl compound. It should be understood that in addition to employing pure oxygen as the oxidizing agent in my process, it is also possible to employ any oxygen containing gas in which the ingredient other than oxygen is inert under the conditions of the reaction. Thus, satisfactory results have been obtained employing air instead of pure oxygen in the feed gas to the reaction. In addition, the reaction proceeds satisfactorily employing mixtures of oxygen and inert gases, such as helium, neon, xenon, krypton, argon, etc. as diluents for the oxygen in the feed gas. However, in the preferred embodiments of my invention I employ either oxygen or air as the oxidizing agent.

The process of this invention may be carried out at subatmospheric pressure, atmospheric pressure or superatmospheric pressures. However, there is no particular advantage to carrying out the process at any pressure other than atmospheric. This is true since the carrying out of the reaction at subatmospheric pressures requires the use of relatively complicated control equipment. In carrying out the reaction at elevated pressures the use of relatively expensive high temperature process equipment is required. Since the reaction proceeds at a reasonable rate at atmospheric pressure, it is not deemed advantageous to carry out the reaction at elevated pressures although there are no particular disadvantages to the use of elevated pressures other than the equipment cost problem.

The temperature of the reaction of the present invention may also vary within fairly wide limits. The reaction can occur with temperatures as low as room temperature (i.e., about 25° C.). However, I have found that at temperatures below about 70° C. the reaction proceeds at a relatively slower rate. Satisfactory results are obtained when running the reaction at temperatures from about 80° C. up to a temperature of about 160° C. However, I prefer to carry out the reaction at the reflux temperature of the reaction mixture. Where the reaction mixture contains a large amount of acetic acid as a solvent, and since this acid is generally the lowest boiling major constituent of the reaction mixture, it is found that the reflux temperature is near the boiling point at atmospheric pressure of the acid, i.e., about 110–115° C.

In the oxidation of the alkyl side-chains to carbonyl or carboxyl groups one of the products of reaction is water. In carrying out the reaction, it is found that the presence of a large amount of water has an adverse effect on the rate of reaction. Thus, when an amount of water in excess of about 0.05 part by weight per part of solvent (5 percent by weight) is allowed to accumulate, the reaction is substantially stopped. Therefore, I prefer to carry out the reaction under nearly anhydrous conditions and with a maximum of about 0.05 part water per part solvent. Minute traces of water are often desirable since these help solubilize $Co(OAc)_2$. Thus, $Co(OAc)_2.4H_2O$ is very soluble in acetic acid while anhydrous $Co(OAc)_2$ is only slightly soluble. However, anhydrous $Co(OAc)_2$ is quite soluble in acetic acid when hydrogen bromide is present. The removal of water during the reaction is readily accomplished by allowing the water to distill from the reaction mixture as it is formed. The effect of water can also be minimized by keeping the ratio of the aralkyl compound to solvent low. Azeotropic agents such as benzene, heptane, etc. or carboxylic acid anhydrides can also be used in removing water from the reaction mixture. In addition to adversely effecting the reaction, large amounts of water tend to impart a yellow color to the reaction products. Keeping the reaction under nearly anhydrous conditions aids in the preparation of colorless products.

The catalyst will be effective in the oxidation of the aralkyl compound regardless of the amount present in the reaction mixture at any given time. However, since oxidation is extremely rapid and water is a product of the reaction, a controlling factor on the rate of oxidation is the rate at which water is removed. Any amount of aralkyl compound can be present during the reaction provided the water content of the reaction mixture is below 0.05 part per part of solvent. In practice, I have obtained satisfactory results when employing in the starting mixture from 0.01 to 0.5 part by weight of the aralkyl compound per part of solvent. Preferably my reaction mixture at the start contains from 0.02 to 0.3 part by weight of the aralkyl compound per part of solvent. It is obvious that the ratio of aralkyl compound to solvent will vary during the course of the reaction since the aralkyl compound is being continuously oxidized to the corresponding aromatic carboxylic acid or ketone. Slow addition of the aralkyl compound to the reaction mixture is one method of keeping the water content low.

As previously mentioned, the products resulting from the oxidation of aralkyl compounds according to this invention depend on the particular aralkyl compound oxidized. Where aryl methyl compounds are oxidized, the products are primarily aromatic carboxylic acids. Where other aralkyl compounds are oxidized, the products are primarily aryl alkyl ketones. Where the aralkyl compounds contain both methyl and other alkyl groups, the resulting products contain both ketonic and carboxylic groups.

An unusual feature of this invention is the rapidity and specificity of oxygen attack on the α-methylene group of aralkyl compounds having more than one carbon on the alkyl side-chain to form arylalkyl ketones in high yields. For example, when ethylbenzene is oxidized according to this invention, there is obtained an 80–90% or higher conversion to acetophenone. However, certain ketones are more susceptible than others to further oxidation to carboxylic acids. Thus, as the length of the alkyl group increases the corresponding ketones found are more susceptible to conversion to carboxylic acids. For example, although acetophenone is stable under reaction conditions, when propylbenzene is oxidized, a lower yield of propiophenone and a high yield of benzoic acid is obtained as compared to the yield of acetophenone and benzoic acid from ethyl benzene.

In certain instances it is desirable to insure the formation of carboxylic acids by further oxidizing the ketones formed in the reaction. For example, in the oxidation of commercial xylene mixtures, which contain ethylbenzene as well as xylenes, it may be undesirable to have acetophenone present as a product contaminant which requires individual separation. Rather it may be preferable that other alkyl benzenes as well as methyl benzenes be converted to carboxylic acids.

One method of insuring the further oxidation of the ketones to carboxylic acids is to pass ozone into the reaction mixture along with oxygen. By controlling the amount of ozone added, it is possible to convert all or any part of the ketone formed to carboxylic acid. The ability to convert aralkyl compounds to either ketones or carboxylic acids lends versatility to the reaction. In addition, it is superior to the prior art process since either carboxylic acids or ketones can be prepared at a rapid rate and in high yields.

In one method of carrying out the process of the present invention using ozone, a mixture of ozone and oxygen prepared by passing oxygen through a conventional ozone generator is passed into the reaction mixture. Generally, the conventional ozone generator is capable of forming ozone from oxygen in such amounts that the concentration of ozone varies up to about 12–14% by weight although the particular concentration of ozone with regard to oxygen is non-critical. Enough ozone should be employed to effect the desired conversion of ketones to carboxylic acids. To insure total conversion, at least one mole of ozone for each alkyl group of the aralkyl compound should be employed. Lesser molar ratios can, of course, be employed where partial conversions are desired.

The following examples are illustrative of the practice of my invention and are not intended for purposes of limitation. In the examples all parts are by weight unless stated otherwise.

The examples were carried out according to the following general procedure. An aralkyl compound and a solvent containing the catalyst were placed in a suitable reaction vessel which was brought to reaction temperature and stirred rapidly. At this time oxygen was passed into the reaction mixture. Except in those examples in which the reaction was carried out below about 100° C. or where acetic anhydride was used as a means of removing water, water formed by the oxidation of the aralkyl compound was removed from the reaction system by distillation during the course of the reaction.

Specific variations from these procedures are indicated in the specific examples. In all examples, except where indicated, the source of cobalt was $Co(OAc)_2 \cdot 4H_2O$ and the source of bromine was hydrogen bromide (HBr). Glacial acetic acid was used in the examples. In certain examples where indicated, the reaction was carried out in a closed system so that oxygen absorption could be accurately measured.

The products of this invention were isolated by conventional techniques. Where aromatic carboxylic acids were prepared, upon termination of the reaction the reaction mixture was allowed to cool to about room temperature and any precipitated aromatic carboxylic acid removed by filtration.

Any aromatic carboxylic acids remaining in the mother liquor were recovered by evaporating most of the solvent, extracting the resulting concentrate with chloroform to separate the monocarboxylic acids from the dicarboxylic acids remaining in the mother liquor, and then evaporating the chloroform to yield the monocarboxylic acids. The residue remaining after chloroform extraction was washed with a small amount of aqueous hydrochloric acid to solubilize the cobalt salts and filtered to separate the dicarboxylic acids.

Ketones were isolated by diluting the reaction mixture with water, extracting the aqueous solution with ether to remove carboxylic acids and ketones, extracting the ether solution with a dilute aqueous solution of sodium carbonate to transfer the carboxylic acids to the basic aqueous solution, and separating the ketones from the ether solution by conventional techniques, such as by distillation, by forming insoluble derivatives, such as the 2,4-dinitrophenylhydrozones, etc. Alternately, the reaction products can be isolated solely by filtration and/or distillation.

In the following examples the molality of bromine is calculated as monoatomic bromine (Br, atomic weight 79.916).

The examples tabulated in Table I illustrate how various concentrations of cobalt and bromine in acetic acid affect the rate at which o-xylene is oxidized. As an index the rate of reaction using an acetic acid solvent which was 0.1 molal in respect to both cobalt and bromine was arbitrarily assigned to a value of 100. In carrying out the examples o-xylene, acetic acid, cobalt and bromine were mixed and heated to about 90–95° C. as a measured amount of oxygen was passed into the system. The reaction was carried out in a closed system so that oxygen absorption data could be accurately observed since the rates were based on oxygen absorbed. Since the reactions were carried out at 90–95° C., water was not removed from the reaction mixture but the presence of water was minimized by keeping the o-xylene-acetic acid ratio very low, i.e., 1.06 g. of o-xylene to 100 ml. of acetic acid (0.1 molal in acetic acid). The results are presented in Table I.

TABLE I

*Effect of Catalyst Concentration*

| Example | Molal Concentration of Catalyst in Acetic Acid | | Relative Rate Constants |
|---|---|---|---|
| | Co | Br | |
| 1 [a] | 0.3 | 0.077 | 85 |
| 2 [b] | .1 | .2 | 0 |
| 3 | .1 | .12 | 20 |
| 4 [a] | .1 | .10 | 100 |
| 5 [a] | .1 | .092 | 95 |
| 6 [a] | .1 | .077 | 80 |
| 7 [a] | .1 | .038 | 50 |
| 8 | .1 | .0077 | 17 |
| 9 | .1 | .00077 | 5 |
| 10 | .05 | .038 | 12 |
| 11 | .02 | .0154 | 1 |
| 12 | .01 | .0077 | 0 |

[a] The amount of oxygen absorbed indicated total conversion of o-xylene to o-phthalic acid.
[b] Source of cobalt and bromine was $CoBr_2 \cdot 6H_2O$.

From Table I, it can be seen that a catalyst having the bromine-cobalt ratio of 2 has no appreciable activity. It can further be seen that the optimum reaction rates are obtained where the ratio is about unity, and that the rate of reaction appears to decrease rapidly as this ratio is increased. However, as the bromine-cobalt ratio is decreased from unity, the catalytic effect decreases, although it is less marked. It is also noted that decreased oxidation rates are observed as the catalyst concentration decreases below 0.1 molal.

The examples tabulated in Table II illustrate the rate at which an aralkyl having more than one carbon atom in the alkyl side-chain, e.g., ethyl benzene, is oxidized by the catalyst of this invention to a ketone as compared to cobalt alone or the catalyst where chlorine is substituted for bromine. As an index, the rate of reaction using an acetic acid solvent which was 0.1 molal in respect to cobalt was arbitrarily assigned the value of 1. The source of cobalt in all examples was cobaltous acetate tetrahydrate $(Co(OAc)_2 \cdot 4H_2O)$, the source of chlorine was concentrated hydrochloric acid (HCl) and the source of bromine was HBr. In carrying out the example, ethylbenzene, acetic acid, $Co(OAc)_2 \cdot 4H_2O$ alone, or in conjunction with HCl or HBr were mixed and heated to about 90–95° C. as a measured amount of oxygen was passed into the system. The reaction was carried out in a closed system so that oxygen absorption data could be accurately observed since the rates were based on oxygen absorbed. Since the reactions were carried out at 90–95° C., water was not removed from the reaction mixture but the presence of water was minimized by keeping the ethylbenzene acetic acid ratio very low, i.e., 1.06 g. of ethylbenzene to 100 ml. of acetic acid, (0.1 molar in acetic acid). The results are tabulated in Table II.

TABLE II

| Ex. | Catalyst | Molal Concentration of Catalyst in Acetic Acid | Relative Rate Constant |
|---|---|---|---|
| 13 | $Co(OAc)_2 \cdot 4H_2O$ | 0.1 | 1 |
| 14 | $Co(OAc)_2 \cdot 4H_2O$ / HCl | 0.1 / 0.1 | 1.3 |
| 15 | $Co(OAc)_2 \cdot 4H_2O$ / HBr | 0.1 / 0.1 | 275 |

From the relative rate constants observed in Table II, it is apparent that the catalyst of this invention is unique since neither cobalt alone nor a catalyst containing so closely related an element as chlorine in place of bromine catalyzes the reaction to an appreciable extent. The fact that only one mole of oxygen per mole of ethylbenzene was consumed in example 15 indicated that ethyl benzene was quantitatively converted to acetophenone and that the reaction stopped at the ketonic stage.

EXAMPLE 16

This example illustrates the high yields of o-phthalic obtained by oxidizing o-xylene, a compound which is difficult to oxidize in high yields by the processes of the prior art using cobalt as a catalyst. This example also illustrates that xylene can be added continuously and further illustrates the reusability of the acetic acid solvent containing the cobalt-bromine-acetic acid catalyst of the present invention.

Two hundred parts of acetic acid, the acetic acid being 0.1 molal in respect to cobalt, was placed in a suitable reaction flask and heated to its reflux temperature of about 110° C. A solution containing 10 parts of o-xylene in 125 parts of acetic acid, the acetic acid being 0.1 molal in respect to bromine, was added over 90 minutes to the reaction mixture as 70 parts per hour of oxygen was also passed into the reaction mixture. Oxygen addition was continued for a total of 5.5 hours. Water formed by the oxidation of xylene was removed from the reaction system by distillation during the course of the reaction. After cooling to room temperature, the precipitate of carboxylic acid was removed by filtration.

The mother liquor was recycled in a second run by again placing it in a reaction vessel, heating it to reflux and adding 88 parts of o-xylene in 100 parts of acetic acid over 100 minutes as oxygen at the rate of 70 parts/hour was passed into the reaction mixture for 5.5 hours under the same conditions. At the end of this time, the reaction mixture was allowed to cool to room temperature and 118.5 parts of precipitated o-phthalic acid was removed by filtration. The mother liquor was evaporated to dryness and extracted with chloroform. From the chloroform solution was obtained 14.7 parts of o-toluic acid by evaporation of the solvent. The residue after treatment with a small amount of water and concentrated hydrochloric acid to solubilize the cobalt salts, yielded 26.7 parts of o-phthalic acid. From the distillate collected during both runs 9 parts of o-xylene was recovered. The total yield of phthalic acid was 145.2 parts. The yield of o-phthalic acid based on o-xylene reacted was 83.0% and yield of o-toluic acid, 6.2%. Total yield of acids, 89%.

EXAMPLE 17

This example illustrates that bromine alone does not cause reaction even in the presence of ozone and that when cobalt is added to the bromine-containing reaction mixture even in the absence of ozone, an excellent yield of the dicarboxylic acid is obtained. This example also illustrates the oxidation of p-xylene to terephthalic acid and the use of a bromocarboxylic acid as catalyst.

A reaction mixture of 10.6 parts of p-xylene and 200 parts of acetic acid, the acetic acid being 0.1 molal in respect to bromine (bromoacetic acid), was heated to reflux as both ozone at the rate of 1 part/hour and oxygen at the rate of 43 parts/hour were passed into the reaction mixture for 1.8 hours. No reaction occurred.

Thereupon, the acetic acid in the same reaction mixture was made 0.1 molal in respect to cobalt and while this reaction mixture was heated to reflux, only oxygen (i.e., no ozone) was passed into the reaction mixture at the rate of 43 parts/hour for 1.8 hours. Water formed by the oxidation of p-xylene was removed from the reaction system by distillation during the course of the reaction. The reaction mixture was cooled to room temperature and 13 parts of terephthalic acid were isolated, a yield of 78% based on xylene reacted. The remainder of the reacted p-xylene was converted to p-toluic acid which is soluble in the mother liquor.

EXAMPLE 18

This example illustrates the fact that iodine (calculated as monatomic iodine) in combination with cobalt in molar equivalent ratios does not catalyze the oxidation even though ozone is present. This example also illustrates the fact that the presence of iodine, even where the proper cobalt-bromine-acetic acid catalyst is present, caused no oxidation.

A reaction mixture of 10.6 parts of p-xylene and 210 parts of acetic acid, the acetic acid being 0.1 molal in respect to both cobalt and iodine (iodoacetic acid), was heated to its reflux temperature of about 110° C. as 1 part/hour of ozone and 43 parts/hour of oxygen were added over 6.2 hours. No reaction took place.

The acetic acid in the reaction mixture was then made 0.1 molal in respect to bromine and the reaction repeated, but without ozone. Still no reaction was observed.

EXAMPLE 19

This example illustrates the use of bromochloroform as a source of bromine for the catalyst.

A reaction mixture of 10.6 parts of p-xylene and 200 parts of acetic acid, the acetic acid being 0.1 molal in respect to cobalt and 0.05 molal in respect to bromine (bromochloroform), was heated to reflux in a reaction vessel. Oxygen was then passed into the reaction mixture at the rate of 43 parts/hour for 2.3 hours. Water formed by the oxidation of xylene was removed from the reaction system by distillation during the course of the reaction. The reaction mixture was cooled to room temperature and 13 parts of terephthalic acid (78% based on xylene reacted) was isolated. The remainder of the reacted xylene was converted to p-toluic acid which is soluble in the mother liquor.

EXAMPLE 20

This example illustrates the fact that a 100% molal excess of bromine over cobalt prevents oxidation and that when the molal ratio is unity the reaction proceeds at a very rapid rate, e.g. 15 minutes.

A reaction mixture of 8.6 parts of p-xylene and 200 parts of acetic acid, the acetic acid being 0.1 molal in respect to cobalt and 0.2 molal in respect to bromine, was heated to reflux in a reaction vessel. Oxygen was passed into this reaction mixture at the rate of 51 parts/hour for 1.5 hours. No reaction occurred.

To the cooled reaction mixture was then added sufficient cobalt to bring the cobalt-bromine molal ratio to unity. This reaction mixture was heated to reflux and oxygen was passed into the reaction mixture at the rate of 51 parts/hour for only 15 minutes. The reaction mixture was then cooled and 10.9 parts of terephthalic acid was separated, an 81% yield based on p-xylene reacted. The remainder of the reacted xylene was converted to p-toluic acid which is soluble in the mother liquor.

EXAMPLE 21

This example illustrates the use of another solvent besides acetic acid. The example also illustrates the fact that acetophenone is not further oxidized by the process of this reaction.

A reaction mixture of 51.6 parts of p-xylene and 150 parts of acetophenone, the acetophenone being 0.27 molal in respect to both cobalt and bromine, was heated to 115° C. as oxygen at the rate of 51 parts/hour was passed into the reaction for 4.2 hours. Water formed by the oxidation of xylene was removed from the reaction system by distillation during the course of the reaction. The reaction mixture was then cooled to room temperature to yield a voluminous precipitate of terephthalic acid.

EXAMPLE 22

This example illustrates the use of mixtures of acetic acid and acetophenone as a solvent for the reaction.

A reaction mixture of 17.2 parts of p-xylene and 130 parts of acetophenone and 70 parts of acetic acid as a solvent, this solvent being 0.1 molal in respect to both cobalt and bromine, was treated in the manner of the prior example except that the temperature employed was 133° C. as 51 parts/hour of oxygen was passed into the reaction mixture for 3.7 hours. The precipitate, 23.8 parts, gave a yield of 88.5%, based on xylene reacted. The remainder of the reacted p-xylene was converted to p-toluic acid which is soluble in the mother liquor.

Other runs were also carried out in a similar manner to give yields of the same order by using as a solvent 85 parts acetophenone to 15 parts acetic acid; 70 parts acetophenone to 30 parts acetic acid; 17 parts acetophenone to 83 parts acetic acid. These parts are by weight.

EXAMPLE 23

This example illustrates the use of an acetophenone-acetic acid mixture as a solvent wherein the mother liquor was utilized in a three-stage oxidation.

A reaction mixture of 43 parts of p-xylene and 100 parts of acetophenone and 500 parts of acetic acid as solvent, this solvent having been made 0.14 molal in respect to cobalt and 0.07 molal in respect to bromine. This reaction mixture was heated to reflux as oxygen at the rate of 68 parts/hour was passed into the reaction mixture over 2.5 hours. At the end of this time the reaction mixture was cooled to yield 57.7 parts of terephthalic acid.

The mother liquor was recycled under similar conditions, using 43 parts of p-xylene to yield 49.3 parts of terephthalic acid.

The mother liquor of the second stage was recycled using 43 parts of p-xylene to yield 70.8 parts of terephthalic acid. The total yield of terephthalic acid was 88%, based on xylene reacted. The remainder of the reacted p-xylene was converted to p-toluic acid which is soluble in the mother liquor.

EXAMPLE 24

This example illustrates the preparation of aromatic carboxylic acids and ketones from a mixture of ortho, meta, and para-xylenes and ethylbenzene.

A reaction mixture of 10 parts of ortho-xylene, 20 parts of meta-xylene, 10 parts of para-xylene, 10 parts of ethylbenzene and 525 parts of acetic acid, the actic acid being 0.1 molal in respect to both cobalt and bromine, was heated to reflux as oxygen at the rate of 68 parts per hour was passed into the reaction mixture over 2.75 hours. Water formed by the oxidation was removed from the reaction system by distillation during the course of the reaction. After cooling to room temperature, a precipitate of 41 parts of mixed phthalic acids was removed by filtration. From the mother liquor was recovered an additional 3.6 parts of mixed dibasic acids and 6.2 parts of acetophenone. The yield of mixed phthalic acids was 71% and the yield of acetophenone, 59%.

EXAMPLE 25

This example illustrates the oxidation of an oxygen-containing aralkyl compound, i.e., p-toluic acid.

A reaction mixture of 20 parts of p-toluic acid, and 210 parts of acetic acid, the acetic acid being 0.38 molal in respect to cobalt and 0.17 molal in respect to bromine, was heated to reflux as oxygen at the rate of 68 parts/hour for 1.3 hours was passed into the reaction mixture. Water formed by the oxidation of p-toluic acid was removed from the reaction system by distillation during the course of the reaction. After cooling to room temperature, a precipitate of 19.6 parts terephthalic acid was removed by filtration, a yield of 80% based on p-toluic acid initially present.

EXAMPLE 26

This example illustrates the oxidation of an oxygen containing compound, i.e., p-toluic acid and the use of a solvent comprising benzoic acid and benzene.

A reaction mixture of 27.2 parts of toluic acid and a solvent containing 24.4 parts of benzoic acid dissolved in 132 parts of benzene, the solvent being .065 molal in respect to both cobalt and bromine, was heated to reflux (80–82° C.) as oxygen was passed into the reaction mixture for 6 hours at the rate of 43 parts per hour. The reaction mixture was cooled to yield a voluminous precipitate of terephthalic acid.

EXAMPLE 27

This example illustrates the oxidation of a bromine-containing aralkyl compound, i.e., o-bromotoluene.

A reaction mixture of 100 parts of o-bromotoluene and 105 parts of acetic acid, the acetic acid being 0.80 molal in respect to cobalt and 0.75 molal in respect to bromine, was heated to reflux as air was passed into the reaction mixture for 3.7 hours. Water formed by the oxidation was removed by distillation during the course of the reaction. After cooling the reaction mixture to room temperature, a voluminous precipitate of o-bromobenzoic acid was recovered by filtering from the reaction mixture.

EXAMPLE 28

This example illustrates the ease at which oxidation occurs, merely by allowing the reaction mixture to stand in contact with air at room temperature without any special equipment. Air was not passed into the reaction mixture.

An evaporating dish containing 10 parts of p-xylene, and 100 parts of acetic acid, the acetic acid being 0.1 molal in respect to cobalt and bromine, was allowed to stand overnight at room temperature. By next morning all of the acetic acid had evaporated leaving behind a precipitate of p-toluic acid.

EXAMPLE 29

This example illustrates the oxidation of aralkyl compound using propionic acid as a solvent. This example also illustrates that xylene can be added continuously and further illustrates the reusability of the catalyst in propionic acid.

To 150 parts of propionic acid, the propionic acid being 0.09 molal in respect to both cobalt (cobalt propionate) and bromine, heated to 110° C. was added 43 parts of p-xylene over one hour. Oxygen was continuously passed into the reaction mixture during the addition and thereafter for a total of 2.1 hours at the rate of 86 parts/hour. Water formed by the oxidation was removed from the reaction system by distillation during the course of the reaction. Eight parts of xylene was recovered in the distillate. After cooling to room temperature, a precipitate was removed by filtration to yield 48 parts of terephthalic acid, a yield of 88% based on reacted xylene.

Another 43 parts of p-xylene was similarly oxidized using the mother liquor from the first oxidation except that oxygen was added over 2.9 hours and 6.2 parts of xylene was recovered from the distillate. The yield of terephthalic acid was 53 parts, or 93% based on xylene reacted.

A third 43 parts of p-xylene was similarly oxidized using the mother liquor from the second oxidation except that oxygen was added over 2.6 hours and 7 parts of xylene was recovered from the distillate. The yield of terephthalic acid was 48 parts, a yield of 83% based on xylene reacted. The remainder of the xylene was converted to p-toluic acid which is soluble in the mother liquor.

EXAMPLE 30

This example illustrates the oxidation of a trimethyl benzene, i.e., mesitylene, to an aromatic tricarboxylic acid.

A reaction mixture of 1.2 parts of mesitylene and 105 parts of acetic acid, the acetic acid being 0.1 molal in respect to cobalt and 0.075 molal in respect to bromine, was oxidized at 87° C. to yield a mixture of mono-, di- and tri-benzenecarboxylic acids.

EXAMPLE 31

This example illustrates the oxidation of a di-methyl ketonic aralkyl compound, i.e., 2,5-dimethyl acetophenone.

A reaction mixture of 1.48 parts of 2,5-dimethyl acetophenone and 105 parts of acetic acid, the acetic acid being 0.1 molal in respect to cobalt and 0.075 molal in respect to bromine, was oxidized at 87° C. to yield acetophenone mono- and di-benzenecarboxylic acids.

EXAMPLE 32

This example illustrates the oxidation of a methyl ketonic aralkyl compound, i.e., p-methylacetophenone, and the use of a mixed solvent comprising benzene and acetic acids.

A reaction mixture of 134 parts of p-methyl acetophenone and a solvent comprising 150 parts of benzene and 350 parts of acetic acid, the solvent being 0.1 molal in respect to cobalt and bromine [Co(OAc)$_2$·4H$_2$O and CoBr$_2$·6H$_2$O], was heated to reflux. Oxygen was passed into the reaction mixture for 3½ hours at the rate of 51 parts/hour. Water formed was removed by distillation during the course of the reaction. A voluminous precipitate of p-acetylbenzoic acid was filtered from the reaction mixture.

The process of this invention can also be used to oxidize compounds of the formula

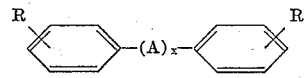

where R is alkyl (methyl, ethyl, propyl, etc.), x is zero or 1 and A is selected from the group consisting of an alkylene radical, an alkylidene radical, oxygen, a carbonyl radical, a sulfone radical, etc.

EXAMPLE 33

This example illustrates the oxidation of a dimethyl diphenylketone,

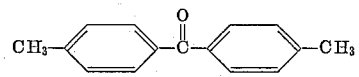

A reaction mixture of 50 parts of p,p'-dimethyl diphenylketone and 315 parts of acetic acid, the acetic acid being 0.25 molal in respect to cobalt and 0.13 molal in respect to bromine, was heated to reflux. Oxygen was passed into the reaction mixture at the rate of 86 parts/hour for 1 hour and 5 minutes. The reaction mixture was cooled to room temperature and 59 parts of p,p'-diphenylketone-dicarboxylic acid,

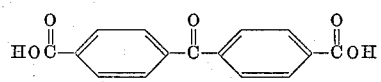

was removed by filtration, a yield of 92%.

EXAMPLE 34

This example illustrates the oxidation of a dimethyl diphenyl ether compound,

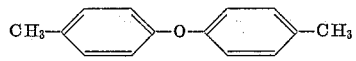

It also illustrates the use of acetic anhydride as a means of removing water.

A reaction mixture of 50 parts of p,p'-dimethyl diphenyl ether and 370 parts of acetic acid, the acetic acid being 0.22 molal in respect to cobalt and 0.11 molal in respect to bromine, was heated to reflux without withdrawing any distillate. Oxygen was passed into the reaction mixture for 1 hour at the rate of 68 parts/hour. A total of 50 parts of acetic anhydride was added dropwise during the reaction to remove water formed.

The reaction mixture was cooled to room temperature and 51 parts of p,p'-diphenylether-dicarboxylic acid,

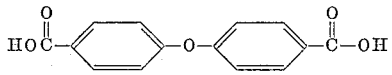

removed by filtration, a yield of 80%.

EXAMPLE 35

This example illustrates the oxidation of ethylbenzene to acetophenone.

To 105 parts of acetic acid, the acetic acid being 0.1 molal in respect to cobalt and 0.075 molal in respect to bromine, was added 16.8 parts of ethylbenzene over a period of 30 minutes. Oxygen was passed into the reaction mixture during the addition and thereafter for a total of 67 minutes at the rate of 51 parts/hour. After sixty minutes at 87° C. the temperature of the reaction mixture was raised to reflux for seven minutes. At the end of this time the products were isolated to yield 15.6 g. of acetophenone (82% yield) and about 0.12 g. of benzoic acid (0.6% yield).

EXAMPLE 36

This example illustrates the use of ozone as a means of increasing the yield of aromatic acids and decreasing the yield of ketones in the oxidation of ethylbenzene. This example also illustrates the use of acetic anhydride as a means of removing water.

A reaction mixture of 12.7 parts of ethylbenzene and 210 parts of acetic acid, the acetic acid being 0.1 molal in respect to both cobalt and bromine, and 10 parts of acetic anhydride was heated to reflux without removing any distillate. Ozone at the rate of 1.5 parts/hour and oxygen at the rate of 51 parts/hour was passed into the reaction mixture for 3.6 hours. At the end of this time, the products isolated were 8 parts of benzoic acid (55% yield) and 6.2 parts of acetophenone (43% yield), a total yield of 98%.

EXAMPLE 37

This example illustrates the oxidation of n-propylbenzene to propiophenone and benzoic acid.

A reaction mixture of 30 parts of n-propylbenzene and 105 parts of acetic acid, the acetic acid being 0.2 molal in respect to cobalt and 0.09 molal in respect to bromine, was heated to reflux. Thereupon oxygen was passed into the reaction mixture at the rate of 51 parts/hour for 1.6 hours. At the end of this time, the products were isolated to yield 15.6 parts of propiophenone (47% yield) and 9.5 parts of benzoic acid (31% yield), a total yield of 78%.

EXAMPLE 38

This example illustrates the oxidation of an oxygen-containing aralkyl compound to a phenylalkylketone.

A reaction mixture of 29.6 parts of p-ethylacetophenone and 100 parts of acetic acid, the acetic acid being 0.1 molal in respect to both cobalt and bromine, was heated to 65° C. Thereupon oxygen was passed into the reaction mixture at the rate of 51 parts/hour for 2 hours and 10 minutes. At the end of this time, the temperature of the reaction was 30° C. The products were isolated to yield 23 parts of p-diacetyl benzene, a yield of 71%.

EXAMPLE 39

This example illustrates the oxidation of an aralkyl compound containing a polynuclear aromatic group, e.g., α-methylnaphthalene.

A reaction mixture comprising 1.4 parts of α-methyl naphthalene and 105 parts of acetic acid, the acetic acid being 0.1 molal in respect to cobalt and 0.075 molal in respect to bromine, was placed in a closed system so that oxygen absorption could be accurately observed. The reaction mixture was heated to 87° C. and oxygen was added as fast as it was absorbed. The resulting clear solution was poured into water to precipitate α-naphthoic acid.

EXAMPLE 40

This example illustrates the oxidation of an aralkyl compound having more than one carbon on the alkyl side-chain and a polynuclear aromatic group, e.g., amyl naphthalene.

α-Amyl naphthalene was oxidized in the manner of Example 39 to yield naphthyl butyl ketone and α-naphthoic acid.

EXAMPLE 41

This example illustrates the oxidation of an aralkyl compound having both a methyl and an ethyl side-chain to a ketonic carboxylic acid.

A reaction mixture of 12 parts of p-ethyl toluene and 105 parts of acetic acid, the acetic acid being 0.1 molal in respect to both cobalt and bromine, was heated to reflux without withdrawing any distillate. Oxygen was passed into the reaction mixture for ¾ hour at the rate of 51 parts per hour. A total of 20 parts of acetic anhydride was added dropwise during the reaction to remove the water formed. The reaction mixture was poured into water and p-acetylbenzoic acid,

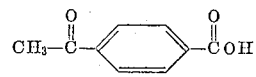

was removed by filtration.

It will be apparent from the preceding examples that a minimum cobalt molality of 0.1 is especially effective in the oxidation of p-xylene to terephthalic acid.

Although the foregoing examples have described a large number of variations and modifications of the proportions of ingredients and reaction conditions which may be employed in the practice of the present invention, it should be understood that my reaction is also applicable to reactants, reaction conditions, and proportions of ingredients which are not specifically illustrated by the examples.

The acids and ketones prepared by the method of this invention exhibit the same utility as the same acids and ketones prepared by any other method. Thus, these acids may be esterified to serve as plasticizers for resinous materials, such as polyvinyl chloride, polyvinyl acetate, etc. Dibasic acids prepared by my process may be reacted with polyhydric alcohols in conventional methods to form polyester resins.

The ketones prepared by my process can be used as solvents for various systems, for example, in coatings, vinyl, vinyl-modified, etc. resin systems. In addition, they can be used as intermediates in the preparation of various drugs, such as antihistamines, vasconstrictors, etc. For example, acetophenone can be used to prepare the pharmaceuticals disclosed in "Chemical and Engineering News," vol. 34, No. 10, p. 1122 (March 5, 1956).

From the foregoing it is evident that a rapid, unique and versatile oxidation process has been described. The foregoing detailed description has been given for clearness of understanding only and no unnecessary limitations are to be understood therefrom. The invention is not limited to the exact details shown and described for obvious modifications will occur to those skilled in the art. For example, although the oxidation generally requires no external initiation from ozone, peroxides, hydroperoxides, etc., the use of these expedients is not precluded. Furthermore, it is obvious that my process is applicable to continuous operation. Thus, where it is desired to convert xylene to phthalic acids, a reaction mixture is made up of acetic acid and the cobalt-bromine-carboxylic acid catalyst and both oxygen and xylene are added continuously. The phthalic acid which is formed, precipitates from the solution and may be continuously withdrawn. Ketones formed can be separated by continuous distillation.

What I claim as new and desire to secure by Letters Patent of the United States is:

The process of oxidizing p-xylene to terephthalic acid, which comprises passing oxygen through an acetic acid solution of (a) p-xylene, in which the p-xylene is present on a weight basis of from 0.01 to 0.5 part of the latter per part of the acetic acid, and (b) an oxidation catalyst dissolved in said acetic acid and consisting essentially of a combination of cobalt acetate and hydrogen bromide, the concentration of the cobalt in the acetic acid being at least 0.1 molal and the catalyst containing from 0.1 to 1.2 atoms of bromine per atom of cobalt, said oxidation process being carried out at atmospheric pressure and at a temperature of from about 80° C. up to about 115° C., the water content in the reaction mixture during the oxidation reaction being maintained at no more than 5 percent, by weight, based on the weight of the acetic acid.

References Cited in the file of this patent

UNITED STATES PATENTS

| | | |
|---|---|---|
| 2,028,348 | Pier et al. | Jan. 21, 1936 |
| 2,119,647 | Pier et al. | June 7, 1938 |
| 2,245,528 | Loder | June 10, 1941 |
| 2,444,924 | Farkas et al. | July 13, 1948 |
| 2,578,654 | Hearne et al. | Dec. 18, 1951 |
| 2,833,816 | Saffer et al. | May 6, 1958 |
| 2,858,334 | Landau | Oct. 28, 1958 |